United States Patent [19]

Mushovic

[11] Patent Number: 5,604,266
[45] Date of Patent: Feb. 18, 1997

[54] CURED UNSATURATED POLYEST-POLYURETHANE HIGHLY FILLED RESIN MATERIALS AND PROCESS FOR PREPARING THEM

[75] Inventor: John N. Mushovic, Salt Point, N.Y.

[73] Assignee: Ecomat, Inc., Poughkeepsie, N.Y.

[21] Appl. No.: 632,573

[22] Filed: Apr. 15, 1996

Related U.S. Application Data

[63] Continuation-in-part of Ser. No. 348,973, Nov. 28, 1994, Pat. No. 5,508,315, which is a continuation of Ser. No. 224,775, Apr. 8, 1994, Pat. No. 5,369,147, which is a continuation-in-part of Ser. No. 961,332, Oct. 15, 1992, Pat. No. 5,302,634.

[51] Int. Cl.$^6$ .............................. C08J 9/32; C08G 18/34
[52] U.S. Cl. .................. 521/122; 521/123; 521/137; 521/172; 521/173; 523/218; 523/219
[58] Field of Search ............................. 521/122, 123, 521/137, 172, 173; 523/218, 219

[56] References Cited

U.S. PATENT DOCUMENTS

| | | |
|---|---|---|
| 2,642,403 | 6/1953 | Simon et al. . |
| 3,008,917 | 11/1961 | Park et al. . |
| 3,585,155 | 6/1971 | Hollstein et al. . |
| 3,697,456 | 10/1972 | Pitts et al. . |
| 3,723,370 | 3/1973 | Watanabe et al. . |
| 3,824,201 | 7/1974 | McGranaghan et al. . |
| 3,830,776 | 8/1974 | Carlson et al. . |
| 3,867,159 | 2/1975 | Ergene . |
| 3,960,785 | 6/1976 | Babcock . |
| 4,111,713 | 9/1978 | Beck . |
| 4,152,368 | 5/1979 | Dorfman et al. . |
| 4,169,824 | 10/1979 | Kane . |
| 4,195,014 | 3/1980 | Dorfman et al. . |
| 4,210,457 | 7/1980 | Dodson et al. . |
| 4,212,953 | 7/1980 | Sheratte et al. . |
| 4,216,294 | 8/1980 | Halle et al. . |
| 4,216,308 | 8/1980 | Rigge et al. . |
| 4,260,538 | 4/1981 | Iseler et al. . |
| 4,287,116 | 9/1981 | Burns . |
| 4,302,553 | 11/1981 | Frisch et al. . |
| 4,320,823 | 3/1982 | Covaleski . |
| 4,331,726 | 5/1982 | Cleary . |
| 4,356,037 | 10/1982 | Novak . |
| 4,394,491 | 7/1983 | Hoffman . |
| 4,409,344 | 11/1983 | Moulson et al. . |
| 4,661,533 | 4/1987 | Stobby . |
| 4,694,051 | 9/1987 | Kordomenos et al. . |
| 4,714,722 | 12/1987 | Najvar et al. . |
| 4,725,632 | 2/1988 | Vess . |
| 4,737,524 | 4/1988 | Ako et al. . |
| 4,740,406 | 4/1988 | Narumiya et al. . |
| 4,760,103 | 7/1988 | Kraft . |
| 4,777,189 | 10/1988 | Shimomura et al. . |
| 4,777,208 | 10/1988 | Hefner, Jr. . |
| 4,816,503 | 3/1989 | Cunningham et al. . |
| 4,822,849 | 4/1989 | Vanderlaan . |
| 4,871,789 | 10/1989 | Martinez . |
| 4,892,919 | 1/1990 | Leitheiser et al. . |
| 4,902,773 | 2/1990 | Bodnar et al. . |
| 4,923,934 | 5/1990 | Werner . |
| 4,929,667 | 5/1990 | Ban et al. . |
| 4,931,376 | 5/1990 | Ikematsu et al. . |
| 4,937,273 | 6/1990 | Obuyama et al. . |
| 4,946,876 | 8/1990 | Carpenter et al. . |
| 4,952,365 | 8/1990 | Shibuya et al. . |
| 5,079,383 | 1/1992 | Matsunaga et al. . |
| 5,086,084 | 2/1992 | Michaelson . |
| 5,093,378 | 3/1992 | Ishiwaka et al. . |
| 5,094,902 | 3/1992 | Haenggi et al. . |
| 5,096,640 | 3/1992 | Brody et al. . |
| 5,098,950 | 3/1992 | Kagaya et al. . |
| 5,225,457 | 7/1993 | Borowczak et al. . |
| 5,286,776 | 2/1994 | Ichikawa et al. . |
| 5,302,634 | 4/1994 | Mushovic ................................ 523/219 |
| 5,369,147 | 11/1994 | Mushovic ................................ 523/219 |
| 5,508,315 | 4/1996 | Mushovic ................................ 521/122 |

FOREIGN PATENT DOCUMENTS

| | | |
|---|---|---|
| 63-179978 | 7/1988 | Japan . |
| 2-178461 | 7/1990 | Japan . |
| WO5/27752 | 10/1995 | WIPO . |

OTHER PUBLICATIONS

Edwards, "The Application of Isophtalic Unsaturated Polyester Urethane Hybrids in Conventional Molding Techniques," *42nd Annual Conference Composites Institute, The Society of the Plastics Industry, Inc.*, pp. 1–6, Session 8–C Feb. 2–6, 1987.
"Interpol 5118", Cook Composites and Chemicals, Inc.
"Interpol 5124", Cook Composites and Chemicals, Inc.
"Interpol 5116", Cook Composites and Chemicals, Inc.
Aluminum Company of America, Material Safety Data Sheet for "Red Mud."
Newsfocus, Industry and Newsfocus, Technology Plastics Technology, Dec. 1992, pp. 14 and 74.
American Electric Power Service Corporation National Safety Data Sheet (Fly Ash).
K. Ashida, Polyisocyanurate Foams, Preparation of Modified Polyisocyanurate Foams, vol. 6, pp. 112–124.
F. A. Shutov, Hollow Sphere Fillers, Syntactic Polymer Foams, vol. 16, pp. 356–359.
Sample Resin Formulations, Formulating Hybrid Resin Molding Compounds, Formulating Hydroxyl–Terminated Unsaturated Isopolyesters, What are Hybrid Resins?

*Primary Examiner*—Morton Foelak
*Attorney, Agent, or Firm*—Bruce D. Gray, Esq.; Kilpatrick & Cody

[57] ABSTRACT

The present invention is directed to a rigid or semirigid, filled resin material having a continuous phase which is a matrix containing a complex crosslinked network having an unsaturated polyester-polyurethene containing resin having fine multisize reinforcing particles and dispersed filler particles dispersed therein. The polyester-polyurethene network of the complex crosslinked network may interact with other polymer networks in the continuous phase either by crosslinking or by forming an interpenetrating polymer network. The complex crosslinked network immobilizes the fine multisize reinforcing particles and reacts with at least a surface layer of the dispersed filler particles. The present invention is also directed to a process for preparing the above rigid or semirigid, lightweight resin material, and to a composition for use in this process. The material of the present invention is useful in a variety of applications, and can be easily varied and modified to include a wide variety of fine multisize reinforcing particles and dispersed filler particles, and to function in a wide variety of uses.

61 Claims, No Drawings

CURED UNSATURATED POLYEST-POLYURETHANE HIGHLY FILLED RESIN MATERIALS AND PROCESS FOR PREPARING THEM

The present application is a continuation-in-part of Ser. No. 08/348,973, filed Nov. 28, 1994now U.S. Pat. No. 5,508,315, which is a continuation of Ser. No. 08/224,775, filed Apr. 8, 1994, now U.S. Pat. No. 5,369,147, which is a continuation-in-part of Ser. No. 07/961,332, filed Oct. 15, 1992, now U.S. Pat. No. 5,302,634. The entire contents of each of these applications is hereby incorporated by reference.

BACKGROUND OF THE INVENTION

1. Field Of The Invention

The present invention is directed to a rigid or semirigid filled resin material comprising a particular resin system comprising an unsaturated polyester-polyurethane containing resin network, which forms a continuous phase matrix, and a dispersed phase within said matrix, comprising fine multisize reinforcing particles and dispersed filler particles, at least a portion of which have reacted with the matrix.

The present invention is also directed to a method of preparing this rigid or semirigid filled resin material.

Further, the rigid or semirigid filled resin material may be in the form of a foamed resin when the fine multisize reinforcing particles are capable of entraining a blowing agent and releasing it at different energy levels. The present invention is also directed to this foamed material and methods for its manufacture.

2. Discussion Of Related Art

The general manufacturing thrust in the polyester and vinyl ester polymer industry in the area of composite materials has been to use the polyester and vinyl ester polymers in glass reinforced structures. In addition, styrene can be used with many polyesters, vinyl esters, and other polymer systems.

Hybrid resins are known, and are described in Edwards, The Application Of Isophthalic Unsaturated Polyester Urethane Hybrids In Conventional Molding Techniques, 42nd Annual Conference Composites Institute, The Society Of The Plastics Industry, Inc., Feb. 2–6, (1987) (pp. 1–6, Session 8-C), U.S. Pat. No. 4,822,849, U.S. Pat. No. 4,892,919 and U.S. Pat. No. 5,086,084.

Interpenetrating polymer networks, or IPNs are also known. An IPN is a material which consists of a pair of networks, at least one of which has been synthesized and/or crosslinked in the presence of the other. An IPN can be described as an intimate mixture of two or more distinct crosslinked polymer networks that cannot be physically separated. Interpenetrating polymer networks can be classified into several categories. For example, when only one polymer is crosslinked and the other is linear, the product is called semi-IPN. U.S. Pat. No. 4,302,553 discloses two structurally different crosslinked polymers, which when combined, form an IPN structure. The IPN structure is comprised of the two different crosslinking polymers which are permanently entangled with one another and characterized in that no chemical interaction had occurred between the individual networks. Interpenetrating polymer networks are also described in U.S. Pat. No. 4,923,934 and U.S. Pat. No. 5,096,640.

U.S. Pat. No. 4,356,037 discloses the preparation of an abrasion resistant coating containing a resin, and dispersed therein first abrasion resistant particles of substantially uniform size, and second abrasion resistant particles of substantially uniform size and having diameters of less than 15.4% of the first particles. This patent does not disclose or suggest the particular unsaturated polyester-polyurethane containing resin system used in the present invention, does not teach or suggest the use of fine multisize reinforcing particles, and does not teach or suggest that the particles be capable of reacting with the matrix.

U.S. Pat. No. 5,286,776 discloses a reinforced polypropylene resin composite containing reinforcing glass fibers and particles of hard mica. This patent does not teach the unsaturated polyester-polyurethane containing resin matrix of the present invention, or disclose dispersed filler particles that are bondable to the resin matrix.

U.S. Pat. No. 5,225,457 discloses a method of processing reinforced polymers wherein base polymers are reinforced by macro short fibers and micro short fibers. This patent does not teach the unsaturated polyester-polyurethane containing resin matrix of the present invention.

U.S. Pat. No. 4,871,789 discloses a filled polymer composition having a polyurethane or polyurea matrix, and containing a reinforcing filler and a supplementary filler comprising a wollastonite or inorganic particle having a particular aspect ratio and particle size. This patent does not teach or suggest the unsaturated polyester-polyurethane containing resin of the present invention.

Foamed and/or cured foams of polymer resins, which may contain inorganic fillers, are described in U.S. Pat. No. 2,642,403, U.S. Pat. No. 3,697,456, U.S. Pat. No. 4,331,726, U.S. Pat. No. 4,725,632, U.S. Pat. No. 4,777,208, U.S. Pat. No. 4,816,503, U.S. Pat. No. 4,216,294, U.S. Pat. No. 4,260,538, U.S. Pat. No. 4,694,051, and U.S. Pat. No. 4,946,876.

Despite this activity, the products produced by the prior art, especially products of lightweight construction materials, do not have sufficiently well-balanced properties with regard to structural strength, as well as with regard to corrosion and thermal resistance, and ease of processing.

Preparation of foams of unsaturated polyesters useful in the manufacture of lightweight building materials has been attempted using a number of different techniques. However, a difficulty encountered in attempts to produce unsaturated polyester foams is the generation of gases so as to cause a uniform expansion of the resin at ambient temperatures before any appreciable crosslinking occurs. The present inventor has discovered that with a two polymer system, a significant portion of the crosslinking and curing does not have to occur immediately after the maximum amount of gases has been released. Indeed, upon completion of the first polymer reaction, the crosslinking reaction can be delayed for hours. However, should appreciable crosslinking occur before maximum gas release, the accompanying exothermic reaction will cause cracking as the previously unreleased gases are generated, thereby causing stresses against a very rigid crosslinked structure which is unable to further expand without the loss of integrity of cell walls. Moreover, should the polyurethane reaction have not occurred to a point sufficient to maintain the cell structures, the gases will gradually escape, and the expanded resin will drop back to its original state. The cured polymer will form much like a standard resin casting, with little or no expansion.

Lightweight cementitious compositions are known in which the desired weight reduction over concrete is achieved by the use of lightweight aggregate. However, articles made from such materials are brittle and possess tensile strengths which are low and limit many practical applications. Also, the density range of lightweight concretes is 1.5 to 10 times higher than the foam of the present invention.

Low density rigid polyurethane modified-polyisocyanurate foams have been widely used as insulative structural members. As with other polymeric materials, it is often desirable to reduce the polymer content and improve the properties of these members by the addition of inorganic fillers. Unfortunately, it has proven difficult to provide a rigid polyurethane or polyisocyanurate foam containing more than about 10% by weight of such fillers. These fillers tend to rupture the cells of the foam, which in turn dramatically reduces its insulative capacity. Another undesirable effect of high levels of fillers is that the foam becomes very friable. Since higher filler levels are desired, because they provide a less expensive material and certain physical property improvements, it would be highly desirable to provide a highly filled, rigid polyurethane-modified polyisocyanurate foam which has good insulative properties and low friability.

U.S. Pat. No. 4,661,533 relates to using a particular inorganic filler, namely fly ash, as the inorganic filler for filling rigid polyurethane modified-polyisocyanurate foams. High percentage additions of fly ash to very light weight (2 pounds per cubic foot (pcf)) insulating foam are described. The use of the fly ash inorganic filler enables the foam to be filled to a theoretical level of about 80% of the foam's total weight without deterioration of the insulative properties, friability and compressive strength. The foam is useful as board insulation, sheathing insulation, pipe insulation and the like. However, even though the foam of the above patent is highly filled with fly ash, the problems associated with the formation of two distinct polymers and hybrid resin technology where a very high percentage of the end product is crosslinkable as a cured polyester (up to 90%) did not have to be addressed. Additionally, the superior processing advantages inherent in the polyester/polyurethane chemistry are not possible with the prior art product. The potential physical properties obtainable from the filled foam of the present invention, having two distinct polymer systems, are much higher, and the ability to control individual reactions in the polyester/polyurethane system used in the present invention is considerably better than that possible with the single shot polyurethane/polyisocyanurate chemistry of the prior art.

SUMMARY OF THE INVENTION

The present invention adopts an approach to composite polymer materials that is completely different from that described above. By using the hybrid polyester-polyurethane resin described below, a base resin is obtained that allows for easy modification by inclusion of different polymer species, and also results in bonding of dispersed filler particles, e.g., thermoplastic scrap or thermoplastic like areas of thermoset scrap, using a two-component or multi-component system which bonds to the filler particle surfaces.

It is an object of the present invention to provide multi-component polymer systems based upon a dual polymer thermoset which forms a continuous matrix phase, and upon the dispersion therein of filler particles, the chemical and physical properties of which can be varied by changing chemical and processing parameters. More specifically, it is an object of the present invention to provide such a system which can be modified by selection of the particular dispersed filler particles and the matrix phase components. This modification results from the contribution of the matrix phase components to the overall properties of the material, and from the bonding properties between the matrix phase and the dispersed filler particles.

It is also an object of the present invention to provide a multi-component polymer system that avoids liquid incompatibilities during processing, thereby increasing the adaptability of the polymer system to the inclusion of additional components in order to adjust its properties. More specifically, it is an object of the present invention to provide fine multisize reinforcing particles to interfere with liquid phase separation that may result from polyol addition incompatibility during processing.

It is another object of the present invention to provide a multi-component polymer system which can be chemically linked to other polymer components, by covalent bonding, crosslinking, as an IPN, or by a combination of these, in order to provide products having desired properties.

It is a further object of the present invention to provide low cost, rigid or semirigid polymeric compositions, both solid and foamed, which contain very high percentages of either single or multiple organic and/or inorganic blends of industrial byproducts and waste materials. It is a further object of the present invention to provide such materials having desirable physical, chemical, and environmental properties, such as good structural strength, corrosion and thermal resistance, and related properties, due to the properties of the matrix phase materials and the bonding of one or more of the types of dispersed particles to the polymeric matrix binder. More specifically, it is an object of the present invention to provide a material wherein the bonding properties between the polymeric matrix and the dispersed particles is specifically tailored to provide the processing flexibility and properties desired, for example those of traditional structural building materials.

Another object of the present invention is to provide a material which recycles and uses large quantities of industrial waste particulates and/or industrial waste material which can be formed into particles by grinding or other procedures, thereby providing low cost castable or castable and foamable materials, and decreasing disposal costs for these industrial waste materials.

Another object of the present invention is to provide a process for preparing the above rigid or semirigid, polymeric compositions, which can be used with conventional, low cost processing equipment.

Another object of the present invention is to provide a rigid or semirigid, polymeric material which can be effectively further reinforced with mineral fillers, ceramic flock, chopped glass, chopped polymer fiber, directional or non-directional glass fabrics, steel, finely ground powdered rubber, and the like, which take advantage of one or both phases to provide this effective reinforcement.

These and other objects and advantages are obtained by the present invention by providing a rigid or semirigid filled resin material, comprising:

(A) a continuous phase comprising a matrix comprising a complex crosslinked network comprising an unsaturated polyester-polyurethane containing resin, wherein said unsaturated polyester-polyurethane containing resin is the reaction product of reaction components comprising an unsaturated polyester polyol, a saturated polyol, a poly- or diisocyanate, and a reactive monomer, and wherein said matrix optionally further comprises:

(1) polyurethane modified hybrid networks;
(2) networks of polymerization products of reactive monomers;
(3) networks of polymerization products of saturated polyester polyol and poly- or diisocyanates;
(4) other networks that may form before, during, or after the formation of the polyester-polyurethane containing resin; or
(5) mixtures of the above networks; and (B) a dispersed phase comprising:
(1) fine multisize reinforcing particles dispersed in said matrix of said continuous phase; and
(2) dispersed filler particles different from said fine multisize reinforcing particles, and having a surface region bonded to said matrix.

These objects are also obtained by providing a process for producing this rigid filled resin material, comprising:

(A) obtaining reaction components comprising an unsaturated polyester polyol, a diisocyanate or polyisocyanate, a saturated polyol, a reactive monomer, and a free radical initiator;
(B) dry mixing fine multisize reinforcing particles with dispersed filler particles different from said fine multisize reinforcing particles and having a surface region capable of bonding with one or more of said reaction components or with a network formed by said reaction components, or with a matrix formed by said network;
(C) introducing at least one liquid reaction component to the dry mixture obtained in (B) in an amount sufficient to wet out the dry mixture;
(D) mixing the remaining reaction components obtained in (A) with the wetted out dry mixture obtained in (c);
(E) reacting the reaction mixture obtained in (D).

The objects of the present invention are also attained by providing a composition and process as disclosed above, wherein the fine multisize reinforcing particles contain a blowing agent which is releasable at different energy levels, and which results in the formation of a rigid, lightweight foamed material.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Multi-component polymer systems comprised of basically two polymers, unsaturated polyesters and polyurethanes, according to the present invention, can be manufactured in at least two ways.

First, hybrid polyols, having molecular chains containing unsaturated polyester polyols and modified by chemical treatment so that the chain contains hydroxyl terminations, can be combined with unsaturated polyester promoters, reactive monomers, catalysts, and poly or diisocyanates. When these components are mixed well and cured, both urethane and unsaturated polyester moieties exist in the resulting polymerized structure. Examples of these materials suitable for use in preparing the unsaturated polyester-polyurethane material used in the present invention are discussed in U.S. Ser. No. 08/348,973, which is hereby incorporated by reference, and are also in more detail below.

Second, the basic ingredients that form an unsaturated polyester polymer having hydroxy terminations, including unsaturated polyester polyols (which need not have hydroxy terminations), promoters, catalysts, and reactive monomers may be blended with saturated polyols and poly or diisocyanates to form an end structure containing both unsaturated polyester and polyurethane networks.

While the resulting molecular structures may differ, the percentages of each polymer species may be approximately equivalent. While the first method, using the hybrid resin, is less complex, the second method is considerably less expensive from the standpoint of the feedstock materials. However, either method may be used to prepare the basic unsaturated polyester-polyurethane containing resin of the present invention.

The percentage of each polymer structure may be varied by varying the amounts of the various reactants added. For example, when a hybrid resin is used, the polyurethane component may be increased by increasing the amount of saturated polyol to the unsaturated hybrid resin, and using the appropriate amount of poly or diisocyanate. This increase in the percentage of polyurethane structure results in a decrease in the amount of unsaturated polyester resin. The percentage of crosslinked polyester resin in the network can be increased by increasing the amount of styrene or other reactive monomer or adding additional crosslinkable polymers or reducing the amount of saturated polyol (to reduce the fraction of urethane component).

The unsaturated polyester-polyurethane containing resin may be at least partially crosslinked with a reactive monomer, or a poly- or diisocyanate, or both. The network formed by the unsaturated polyester polyurethane per se may be entangled with the other networks described above (e.g., with a polyurethane network obtained by reaction of a poly- or diisocyanate with a saturated polyester polyol, or with a modified polyurethane hybrid resin obtained by reaction of a polyisocyanate, an unsaturated polyester polyol, a saturated polyester polyol, and styrene monomer in the presence of a free radical initiator) to form an interpenetrating polymer network (IPN), or may be crosslinked with these networks. Regions of IPN and crosslinking may both exist in the same material.

The unsaturated polyester-polyurethane containing resin may also contain domains wherein the unsaturated polyester polyurethane network is bonded to other polymer resins, such as epoxy resins (including, e.g., bisphenol A epoxy resins, such as, CIBA-GEIGY bisphenol A epoxy solutions), acrylic resins (e.g., Ashland ATLAC), vinyl ester resins (e.g., Dow Duracane 411–45 or Reighhold resins), siloxane resins, or combinations of these resins. This bonding may take the form of direct covalent bonding or crosslinking to the other polymer resins. In addition to, or in place of the above bonding, the unsaturated polyester polyurethane network may be interwoven with networks of the other polymer in the form of an IPN. Regions of both IPN and crosslinking may occur in the same matrix. These additional polymer resins may be included by adding reaction components known to form the particular polymer resin to the matrix resin forming system, as discussed below.

The term "unsaturated polyester-polyurethane containing resin" is used herein to refer to not only the unsaturated polyester-polyurethane network per se, but to networks having regions of unsaturated polyester-polyurethane bonded, either directly or by crosslinking, to regions of any of the other polymer resins or other networks discussed above. For example, a network comprising regions of unsaturated polyester-polyurethane crosslinked or directly bonded to regions of a network of polymerization products of a reactive monomer (e.g., styrene) which are bonded to regions of an epoxy resin would be included within the scope of the term "unsaturated polyester polyurethane containing resin."

It is this ability of the unsaturated polyester polyurethane network to not only bond to the fine multisize reinforcing particles and the dispersed filler particles, but to also allow for the easy inclusion of additional polymer networks, which allows modification or variation of the composite in at least two ways. First, these additional polymer networks affect the properties of the composite due to their presence therein, by adding their own physical and chemical properties to the system. Second, the presence of the additional polymer resin and/or additional networks may, in combination with certain dispersed filler particles, result in better bonding and adhesive strengths to dispersed filler materials that preferentially react with or bond to the particular polymer resin or network.

The variability of the fine multisize reinforcing particles, dispersed filler particles, and presence of additional polymers in the material allows its physical properties to vary from a rigid material (e.g., having a tensile elongation of about 1–2%) through a semirigid material (e.g., having a tensile elongation of about 5–10%) to an almost elastomeric material.

The saturated polyol may be any polyol which forms a urethane by reaction with isocyanates, e.g., a saturated polyester polyol, a saturated polyether polyol, or a saturated caprolactam polyol, and organic diols or polyols may also be included in step (A) to help form additional polymer networks, which may also bond to the dispersed filler particles. Flame retardants, such as those described above, may also be included in step (A). Catalysts and surfactants may also be included in step (A).

The reactive monomer may be selected from the group consisting of styrene monomers, vinyl monomers, and mixtures thereof. The free radical initiator may be selected from the group consisting of azoisobutyronitrile and an organic peroxide, such as benzoyl peroxide.

As pointed out above, the continuous phase may also contain additional polymers, which can form their own networks, or form part of the polyester-polyurethane network, or both. Examples of such polymers include epoxy resins, vinyl ester resins, and siloxane resins. These polymers are included in the continuous phase by including resin-forming materials, such as monomers or prepolymers, in the mixture of unsaturated polyester polyol, polyisocyanate, reactive monomer, etc., as discussed above.

The continuous phase may also contain a flame retardant, such as a halogenated diol or polyol.

The typical mineral filler for thermoplastic and thermoset polymers is normally characterized as a chemically pure, homogeneous solid with a narrow particle size distribution. In contrast, the fine multisize reinforcing particles used in the present invention may have diverse chemical compositions and should have a wide range of particle sizes.

The fine multisize reinforcing particles may have a particle size distribution in the range of submicron particles to sizes as large as 200 microns, more particularly a range of 0.1 to 100 microns. The particles may be selected from the group consisting of slate dust, treated red mud, aluminum hydrates, alkaline earth carbonates, such as calcium carbonates or magnesium carbonates, calcium sulfate, metal borates, feldspars, clays, kaolinite, bentonite, beidellite, hydroxides, fly ash, optionally preloaded with a blowing agent when a foam is desired, diatomaceous earth, broken or cracked microballoons, broken or cracked microspheres, cenospheres separated from fly ash, Fullers earth, wood flour, cork dust, cotton flock, wool felt, shredded or finely powdered cornstalks, finely ground nut shells, and mixtures thereof. Slate dust and fly ash are particularly useful in this regard.

The term "dispersed filler particles" as used herein is intended to encompass not only particles, but also fibers and fabrics. The dispersed filler particles are chemically bonded to the polymer matrix. This bonding occurs in a surface region of the dispersed filler particle, which may be the surface per se, or may extend to some depth below the surface at which depth the particle and the matrix are capable of bonding. The dispersed filler particles may be organic polymeric material, such as polymeric scrap, more particularly thermoplastic, thermoset, or elastomeric material, that has been formed into particles by crushing, grinding, pulverizing, etc.

The dispersed filler particles may also be inorganic material, including mineral fillers, such as slate particles or chips, silicate, asbestos, calcium carbonate, mica, barytes, alumina, talc, carbon black, metal oxides, quartz, novaculite silica, garnet, saponite, calcium oxide, and mixtures thereof.

Examples of suitable materials for the dispersed filler particles include chlorinated polyvinyl chloride, reinforced polyester or polyester filled thermoset scrap, rubber, glass, sand, ceramic flock, such as a silica alumina ceramic fiber or carbon fiber, chopped glass, chopped polymer fiber, directional or nondirectional glass fabrics, steel, finely ground powdered rubber, aramid based fibers, such as kevlar, and mixtures thereof.

The dispersed filler particles may comprise mixtures of any of the above materials. Further, if necessary to achieve or enhance chemical bonding between the surface region of a particular dispersed filler particle and a particular matrix, the surface of the filler particle may be modified by the addition of known surface modifiers, such as silane or polymer emulsion coatings.

Desirably, the dispersed filler particles are present in amounts of between 15 and 75% by weight, based upon the weight of the total material.

Because the fine multisize reinforcing particles have a high specific surface area, they require more polymer matrix to immobilize them, and the relative amounts of fine multisize reinforcing particles and dispersed filler particles used is dependent upon the amount of total filler to be included in the final product. For instance, when it is desired to obtain a final filled product having about 85% by weight total filler (fine multisize reinforcing particles and dispersed filler) based upon the weight of the final composition, the amount of fine multisize reinforcing particles should be around 20 to 25% by weight of the total filler amount. When a product having greater than 85% by weight of total filler is desired, then the fine multisize reinforcing particles should only form about 15–20% by weight of the total filler. When a product having about 70% by weight of total filler is desired, then the fine multisize reinforcing particles and the dispersed filler particles can be present in amounts of about 50% by weight of the total filler. When a product having only 60% by weight of filler is desired, then virtually any fraction of fine multisize reinforcing particles can be used.

When a foamed product is desired, the fine multisize reinforcing particles used in the present invention may be any particles that will reinforce the cell walls of the foamed material, as more particularly described below, and at least a portion of which are capable of entraining a blowing agent, either through chemical or physical interactions, and of releasing the blowing agent during the foaming reaction, also more particularly described below. Desirably, the reinforcing particles possess, or are ground to possess, a particle size distribution of submicron to 200 microns, more particularly 0.1 to 100 microns.

These reinforcing particles may be selected from treated red mud, aluminum hydrates, feldspars, clays, shales, slates, kaolinite, bentonite, beidellite, hydroxides, such as calcium hydroxide, or any particle having a particle size distribution similar to that of red mud, and capable of releasing water at various energy levels during the reaction forming the continuous phase matrix, as more particularly described below. Mixtures of these particles may also be used.

The reinforcing particles may also be selected from fly ash which has been preloaded with a blowing agent, diatomaceous earth, broken or cracked microballoons, broken or cracked microspheres, cenospheres separated from fly ash, Fullers earth, wood flour, cork dust, cotton flock, wool felt, shredded or finely powdered cornstalks, finely ground nut shells, and other fine size cellular materials having a particle size distribution similar to that of fly ash. Mixtures of these particles may also be used.

Particles such as diatomaceous earth, broken or crushed microballoons, broken or crushed microspheres, cenospheres separated from fly ash, Fullers earth, and wool felt should be preloaded with a blowing agent before reaction, as is done with fly ash. Particles such as wood flour, cork dust, cotton flock, shredded or finely powdered cornstalks, or finely ground nut shells already contain water entrained therein, and may be used as is, or after preloading with additional blowing agent.

Moreover, mixtures of particles from each of the above groups may be used. The reinforcing particles for use in a foam are desirably preloaded fly ash.

The reinforcing particles in the foam may be supplemented by mineral fillers, chopped glass, chopped polymer fiber, directional or nondirectional glass fabrics, steel, finely ground powdered rubber, or any of the fine multisize reinforcing particles described above, which may or may not be capable of entraining a blowing agent. Mineral fillers and powdered rubber should be ground to a particle size distribution consistent with that of the reinforcing particles, such as the particle size distribution of fly ash or treated red mud. This supplementing of the fine multisize reinforcing particles is in addition to the inclusion of dispersal filler particles, as discussed above.

The continuous phase of the rigid, filled resin material according to the present invention serves as a binder for the reinforcing particles and filler discussed above This continuous phase comprises at least an unsaturated polyester polyurethane hybrid resin, which forms a matrix comprising a complex cross-linked network. The polyester polyurethane hybrid resin is formed by reacting an unsaturated polyester polyol, a saturated polyol, a poly- or diisocyanated and a reactive monomer, as shown in more detail below, and may be crosslinked with either said reactive monomer or said poly- or diisocyanate, or both. This reaction mixture may form additional networks which may become entangled or crosslinked with the polyester polyurethane hybrid network, and thus incorporated into the continuous phase network. As a result the continuous phase may also comprise, as exemplary networks polyurethane modified hybrid networks, or networks formed from polymerization products of reactive monomers, or networks formed from polymerization products of a saturated polyol with a poly or diisocyanate, or other networks that may form during the above-described reaction, or mixtures of any or all of these networks.

These networks may individually immobilize the reinforcing particles discussed above. Alternatively, when multiple networks are present they may be entangled, crosslinked together, or otherwise interact, further immobilizing the reinforcing particles. For example, the crosslinked polyester polyurethane hybrid resin network may form an interpenetrating polymer network, or IPN, with a second polyurethane network formed by the reaction of a diisocyanate or polyisocyanate with a saturated polyester polyol. Furthermore, the above-mentioned crosslinked hybrid resin may form a modified IPN with said second polyurethane network and with a third modified hybrid network formed by the reaction of a diisocyanate or polyisocyanate, an unsaturated polyester polyol, a saturated polyester polyol, and a reactive monomer.

As pointed out above, the polyester polyurethane hybrid resin network may be entangled with other polymer networks to form an interpenetrating polymer network, or IPN. An IPN is a material which consists of a pair or networks, at least one of which has been synthesized and/or crosslinked in the presence of the other. Interpenetrating polymer networks (IPN) are more or less intimate mixtures of two or more distinct crosslinked polymer networks that cannot be physically separated. IPN can be considered as another technique, very much like graft or block copolymerization, for inducing polymer blend compatibility through polymer structure modification. The possibility of combining various chemical types of polymeric networks has produced some IPN compositions that exhibit synergistic behavior. If one polymer is elastomeric in nature and another is glassy, then a reinforced rubber is obtained if the elastomer phase predominates, and an impact-resistant plastic results if the glassy phase predominates.

There are several categories of interpenetrating polymer networks. When only one polymer is crosslinked and the other is linear the product is called a semi-IPN. Semi-IPN or semi-2-IPN exists when, respectively, polymer 1 or polymer 2 is the crosslinked component. Furthermore, in addition to IPN—the general term for interpenetrating polymer network—there can be distinguished the simultaneous interpenetrating network (SIN), wherein both polymers are synthesized simultaneously, by either addition or condensation polymerization reactions, and the interpenetrating elastomeric network (IEN). An IEN refers to those materials that are made by mixing and coagulating two different polymer latexes, and crosslinking the coagulum to form a three-dimensional structure. If the latex coagulum is not crosslinked, the resulting product is called a latex polyblend.

In the continuous phase of the present invention, although normally crosslinking is present within each phase, in areas where a true IPN exists, there is no polyurethane to polyester crosslinking. This area of the foam is called an IPN (interpenetrating polymer networks) structured composite. IPNs are formed when polymerization compositions are independently reacted to form distinct, intertwining, continuous polymeric chains. Chemically combining different types of polymeric networks results in the formation of resins having different properties. The IPN which is produced exhibits properties that are different from the individual constituent polymers.

As discussed above, an IPN may form in the material of the present invention by the reaction of the unsaturated polyester polyol, which has hydroxy terminal groups, with a diisocyanate and/or polyisocyanate and a reactive monomer, which crosslinks the resulting polyester-polyurethane chain, and the independent reaction of a saturated polyester polyol with said diisocyanate and/or polyisocyanate to form a polyurethane. A modified hybrid IPN may also form in the material of the present invention when, in addition to the above reactions, said diisocyanate and/or polyisocyanate forms an additional network by reaction with said unsaturated polyester polyol, said reactive monomer, and said saturated polyester polyol. This complex third network may intertwine with one or both of the other two networks. Other, more complex arrangements are also possible.

For example, crosslinking between networks may occur to various degrees, and usable structures may be formed from networks having minor degrees of crosslinking and significant entanglement, forming IPN-like structures in that the networks are entangled, but also contain some crosslinking. Usable structures may also be formed from networks that have an extremely high degree of crosslinking, e.g., between all of the polymer networks present. This is more likely to occur with hybrid resins containing high functionality polyisocyanates and saturated and unsaturated polyols having large numbers of hydroxyl sites.

Hybrid resins are well-known in the art, and hybrid polyester-polyurethane resins combine the best features of the polyester and polyurethane technologies. The resins are tougher than polyesters, and are stronger, stiffer and less costly than polyurethanes. Unsaturated polyester-polyurethanes contain double bonds which can react with styrene to form a strong, yet flexible solid.

Urethane hybrids are also versatile, and can be formulated for use in virtually any method of molding common to the unsaturated polyester and urethane industries. Equally important, they can be cured in a matter of seconds at room temperature or can be molded at elevated temperatures. They can be of low viscosity for ease of pumping or to embrace high levels of filler and reinforcement, or they can be thickened to flow only under high pressures and temperatures.

The weight percent range of polyurethane in the overall filled polyester/polyurethane structure should be between about 10% and 60%. Below 10% the contribution of the urethane to the properties of the structure is minimal. If the urethane percentage is over 60%, some polyester crosslinking reactions may be hindered, and manufacturing consistency may be lost.

Unsaturated polyesters useful in forming the polyester polyol-polyurethane hybrid resin are typically prepared as the condensation reaction products of at least a di- or a polybasic acid, or an anhydride thereof, and a di- or polyhydric compound, wherein at least one of said acid or anhydride, or said di- or polyhydric compound contains ethylenic unsaturation. Optionally, flame retardant materials may be included as a reactant in the formation of said unsaturated polyester.

The unsaturated polyesters of the present invention are generally employed in a proportion ranging from about 20 to 80 parts, preferably 40 to 70 parts, per 100 parts by weight based on the total weight of the curable foamable composition, exclusive of the weight of reinforcing particles.

Typical di- or poly-basic acids or anhydrides thereof used in the preparation of the unsaturated polyesters include, but are not limited to, phthalic acids, iso- or terephthalic acid, adipic acid, succinic acid, sebacic acid, maleic acid, fumaric acid, citaconic acid, chloromaleic acid, allylsuccinic acid, itaconic acid, mesaconic acid, citric acid, pyromellitic acid, trimesic acid, tetrahydrophthalic acid, thiodiglycollic acid, and the like. These acids and anhydrides may be independently or jointly used.

Typical di- or polyhydric compounds used in the preparation of the unsaturated polyesters include, but are not limited to ethylene glycol, diethylene glycol, triethylene glycol, propylene glycol, dipropylene glycol, glycerol, 2-butyn-1,4-diol, neopentyl glycol, 1,2-propanediol, pentaerythritol, mannitol, 1,6-hexanediol, 1,3-butylene glycol, 2-buten-l,4-diol, hydrogenated bisphenol A, bisphenoldioxyethyl ether, bisphenol-dioxypropyl ether, neopentyl glycol and the like.

A variety of reactive monomers may be used. The reactive monomers may be mixed in with the polymeric components of the composition of the present invention in an amount sufficient to produce a thermoset product. In general, the proportions employed range from about 10 to 25 parts by weight, preferably 10 to 20 parts by weight per 100 parts by weight based on the total weight of the curable composition exclusive of the weight of reinforcing particles. Specific examples include, but are not limited to, styrene, chlorostyrenes, methyl styrenes such as s-methyl styrene, p-methyl styrene, vinyl benzyl chloride, divinyl benzene, indene, allyl benzene unsaturated esters such as: methyl methacrylate, methyl acrylate and other lower aliphatic esters of acrylic and methacrylic acids, allyl acetate, vinyl acetate, diallyl phthalate, diallyl succinate, diallyl adipate, diallyl sebacate, diethylene glycol bis(allyl carbonate), triallyl phosphate and other allyl esters, and vinyl toluene, diallyl chlorendate, diallyl tetrachlorophthalate, ethylene glycol diacrylate, ethylene glycol dimethacrylate, ethylene glycol diethacrylate, amides such as acrylamides, vinyl chloride, and mixtures thereof. Among these examples, styrene is preferred.

The isocyanate component of the curable composition of the present invention has a isocyanate functionality of two or more. The isocyanate component may thus be a diisocyanate or polyisocyanate. The diisocyanates or polyisocyanates of the present invention are generally employed in a proportion ranging from about 5 to 40 parts, preferably 15 to 20 parts by weight, per 100 parts by weight based on the total weight of the curable composition exclusive of weight of reinforcing particles.

The diisocyanates or polyisocyanates include aliphatic, alicyclic and aromatic types. Representative examples include 2,4-tolylenediisocyanate, 2,6-tolylenediisocyanate, 1,6-hexamethylenediisocyanate, 4,4'-diphenylmethanediisocyanate, 4,4'diphenylether-diisocyanate, m-phenylenediisocyanate, 1,5-naphthalene-diisocyanate, biphenylenediisocyanate, 3,3'-dimethyl-4,4'-biphenylenediisocyanate, dicyclohexylmethane-4,4'diisocyanate, p-xylylenediisocyanate, m-xylylene-diisocyanate, bis(4-isocyanatophenyl) sulfone, isopropylidene bis(4-phenylisocyanate), tetramethylene diisocyanate, isophorone diisocyanate, ethylene diisocyanate, trimethylene diisocyanate, propylene-1,2-diisocyanate, ethylidene diisocyanate, cyclopentylene-1,3-diisocyanates, 1,2-,1,3- or 1,4-cyclohexylene diisocyanates, 1,3- or 1,4-phenylene diisocyanates, polymethylene polyphenyleneisocyanates, bis(4isocyanatophenyl) methane, 4,4'-diphenylpropane diisocyanates, bis(2-isocyanatoethyl)carbonate, 1-methyl-2,4-diisocyanatocyclohexane, chlorophenylene diisocyanates, triphenylmethane-4,4', 4"-triisocyanate, isopropyl benzene-α-4-diisocyanate, 5,6-diisocyanatobutylbicyclo[2.2.1]hept-2-ene, hexahydrotolylene diisocyanate, 1-methoxyphenyl-2,4-diisocyanate, 4,4', 4"-triphenylmethane triisocyanate, polymethylene polyphenylisocyanate, tolylene-2,4,6-triisocyanate, 4,4'- dimethyldiphenylmethane-2,2', 5,5'-tetraisocyanate, and mixtures thereof.

The curable composition of the present invention may optionally contain di- or polyhydric compounds, capable of reacting with the isocyanate component to form polyurethanes.

The typical optionally contained di- or poly-hydric compounds include ethylene glycol, diethylene glycol, triethylene glycol, propylene glycol, dipropylene glycol, glycerol, 2-butyn-1,4-diol, neopentyl glycol, 1,2-propanediol, pentaerythritol, mannitol, 1,6-hexanediol, 1,3-butylene glycol, 2-buten-1,4-diol, hydrogenated bisphenol A, bisphenoldioxyethyl ether, bisphenol-dioxypropyl ether, neopentyl glycol and the like and mixtures thereof.

Examples of curing catalysts include free radical initiators, such as azo compounds such as azoisobutyronitrile, and organic peroxides, such as tertiary-butyl perbenzoate, tertiary butyl peroctoate, benzoyl peroxide, methyl ethyl ketone peroxide, acetoacetic peroxide, cumene hydroperoxide, cyclohexanone hydroperoxide, and dicumyl peroxide. Benzoyl peroxide is preferred. The catalyst is used in an amount of 0.03 to 2.5 parts by weight, preferably 0.5 to 1.0 parts by weight, per 100 parts by weight based on the total weight of the curable composition, exclusive of the weight of fine multisize reinforcing particles or dispersed filler particles.

To accelerate the curing, a metal compound may be optionally added. Examples include cobalt naphthenate, cobalt octanoate, divalent acetylacetone cobalt, trivalent acetylacetone cobalt, potassium hexanoate, zirconium naphthenate, zirconium acetylacetonate, vanadium naphthenate, vanadium octanoate, vanadium acetylacetonate, lithium acetylacetonate and combinations thereof. Other accelerators include tertiary amines such as dimethylaniline, diethylaniline and dimethyl-p-toluidine.

Catalysts which promote the formation of urethane linkages by reaction of isocyanate groups and hydroxy groups include amine compounds, such as triethylenediamine, N-methylmorpholine, tetramethyl-1,4-butanediamine, N-methylpiperazine, dimethylethanolamine, diethyl-ethanolamine, triethylamine, and the like; and organometallic compounds, such as stannous octanoate, dibutyltin dilaurate, dibutyltin di-2-ethylhexanoate, and the like. These may be used alone or in combination with one another. The catalyst can be used in a broad range of amounts, usually 0.03 to 2.0 parts by weight, preferably 0.02 to 1.0 parts by weight, per 100 parts by weight based on the total weight of the curable composition, exclusive of the weight of reinforcing particles.

The foaming or blowing agent which may be optionally added to the curable foamable composition of the present invention includes water or a low-boiling volatile liquid. Examples of low-boiling volatile liquids are halogenated hydrocarbons which include trichloromonofluoromethane, dibromodifluoromethane, dichlorodifluoromethane, dichlorotetrafluoroethane, monochlorodifluoromethane, trifluoroethylbromide, dichloromethane, methylene chloride, and the like. These may be used alone or in combination with one another. Other conventional foaming or blowing agents are also within the scope of this invention.

Fire retardant raw materials may optionally be included as a reactant in the preparation of the unsaturated polyester polyol component, of the polyurethane component, or of both. Alternatively, these flame retardant raw materials may simply be physically mixed and become part of a dispersed ingredient in the composition of the present invention.

Fire retardant materials which may be used as reactants in the preparation of the unsaturated polyesters include tetrachlorophthalic anhydride, tetrabromophthalic anhydride, dibromotetrahydrophthalic anhydride, chlorendic acid, tetrabromobisphenol A, dibromoneopentyl glycol and the like. Said fire retardant materials are preferably contained in a proportion ranging from 5 to 40, preferably 15–20 parts by weight based on the total weight of the curable composition, exclusive of the weight of the reinforcing particles.

The hybrid cured material of the present invention may also contain non-reactive halogen-containing material in a proportion ranging from about 5 to 20 parts, preferably about 5 to 10 parts by weight, per 100 parts by weight based on the total weight of the curable composition exclusive of the weight of reinforcing particles or dispersed filler particles. These non-reactive halogen-containing materials include organic and/or inorganic materials. The organic materials include halogenated aliphatic, cycloaliphatic, cyclic and aromatic hydrocarbons. Illustrative are tetrachlorobutane, tetrabromobutane, hexabromoethane, chlorendic anhydride, tetrahalogenated phthalic anhydride, tetrabromocyclooctane, tetrachlorocyclooctane, hexachlorocyclopentadiene, hexabromocyclododecane, hexachlorocyclododecane, hexabromocyclohexane, pentabromotoluene, and the halogenated bi- and polyphenyl aromatic compounds. Halogenated polymeric materials are also useable. Inorganic materials include metal oxides, such as antimony oxides, iron oxides, copper oxides, titanium oxides and mixtures thereof. Illustrative examples include antimony trioxide, antimony tetraoxide, antimony pentoxide, ferric oxide, cupric oxide, titanium dioxide, etc.

Coupling agents, such as silanes or titanates, may also be included in the preparation of the rigid materials of the present invention to improve the physical properties of the material by binding the hybrid resin more strongly to the reinforcing particles.

Various methods for pretreating the various foamable composition components, methods for producing the foam, and methods for forming the foam into various structural shapes are disclosed in U.S. Ser. No. 08/348,973, which is hereby incorporated by reference.

Even when a foam is not desired, prior to being included in the curable formulation of the present invention, the fine multisize reinforcing particles are desirably subjected to a pretreatment process. Desirable pretreatments of the particles may comprise grinding to a particle size distribution consistent with that of fly ash or red mud, or drying, as described in U.S. Ser. No. 08/348,973 for red mud.

The step of filling the material with the fine multisize reinforcing particles does not appear to be time dependent, and the particular placement of the reinforcing particles in part depends on the type of metering, mixing, and dispensing equipment. In the simplest case, the filling step comprises calculating a specific weight of reinforcing particles based on the overall reactive polymer weight, to establish a weight percent range (anywhere from 10% to 85%) preferably 60%; adding the weighed particles to either the polyester polyol, diisocyanate or polyisocyanate, or both; totally wetting out all reinforcing particles by shear mixing, without inadvertently mixing the reactants; blending in any special purpose reactive additive, e.g., a reactive flame retardant polyol, a capped non-reactive polymer network to be further combined in an IPN, etc.; and finally allowing air bubbles, which may have been mixed in, to escape from the two blends, so that massive instabilities are not present during curing. When a foam is desired, reinforcing particles containing water as a blowing agent, or which are to be preloaded with a blowing agent reactive with isocyanates should not, in general be added to the isocyanate component, but should instead be premixed with the polyester polyol component.

The mixing of the filled reactants is time dependent, and requires an efficient shear mixer to homogeneously blend the thickened, filled materials. The crosslinking reaction which occurs after the first sets of reactions forming urethane and urea can be delayed to the point where additional processing steps can be accomplished on the partially cured mass.

Economic benefits related to machine capacity and mold filling requirements result from using a filler system having relative amounts of either or both reinforcing particles that can be tailored to control curing rates. Specifically, smaller, less expensive metering, mixing, and dispensing equipment can be used to fill molds that would normally require larger machines due to a fixed, short reaction time after mixing.

The free radical initiated copolymerization of the reactive monomer and the unsaturated polyester polyol occurs after the urethane reaction is well underway. This crosslinking reaction significantly hardens the binder, and is the final curing step, comprising reacting the ethylenically unsaturated groups of unsaturated polyester-polyurethane and the reactive monomer, which serves both as a diluent for the reaction system and as a curing agent.

Examples of hybrid materials suitable for use as the unsaturated polyester-polyurethane in the present invention are discussed in U.S. Ser. No. 08/348,973, which is hereby incorporated by reference.

The selection of the particular fine multisize reinforcing particles, dispersed filler particles, and optionally, any additional polymer forming material to be included in the matrix, is in part dependent upon the desired properties of the final product, and its intended use.

For example, in products where thermal expansion must be controlled, the matrix should include epoxy resin networks, which may be bonded to, crosslinked with, or intertwined with (as an IPN) the unsaturated polyester-polyurethane resin. Fillers that bond well with epoxy should also be used, such as carbon, ceramic, etc. In this way, preferably solid, low coefficient of expansion products can be produced and used as sheathing, slate, boards, or other products that must be secured by nails, screws, or glue.

In products where flame retardency is desired, a flame retardant material, such as scrap CPVC, can be used as the dispersed filler particles, and the overall filler level can be increased. This material can then be used to provide flame retardant materials, such as solid or foamed countertops, for use inside the home.

Where a wear resistant surface is necessary, the overall filler level can be increased, and a wear resistant polyurethane can be used as the dispersed filler particles. In addition, the polyurethane percentage in the binder can be increased. This material can be used for wear resistant interior or exterior tiles, either in solid form or slightly foamed.

Where a weather resistant material is necessary, siloxane can be added to the binder, the type and amount of filler can be selected to promote staining, and the overall filler level can be increased. This material can be used to prepare exterior products, both solid and foamed.

Furthermore, where the properties of two different dispersed filler materials, or two different resin systems are desired in a single product, the filler materials and/or the resin materials can be combined therein with the unsaturated polyester-polyurethane containing resin and the fine multisize reinforcing particles. For instance, an unsaturated polyester-polyurethane-siloxane-epoxy containing matrix may be used in applications that require a low expansion, high strength material having good weatherability, such as decorative wear resistant tiles, hurricane shutters, and other structural products.

In general, the materials of the present invention may be prepared by, e.g., mixing the hybrid resin (or an unsaturated polyester polyol, a saturated polyol, a poly- or diisocyanate, and a reactive monomer, all of which react to form the hybrid resin), which is desirably diluted with styrene, with a saturated polyol, the fine multisize reinforcing particles, and the dispersed filler particles, and separately mixing a polyisocyanate and a polymerization initiator, and then combining these two mixtures just before molding to initiate polymerization. The material is then allowed to cure in the mold, and removed therefrom. A silicone surfactant may be included in the hybrid resin mixture to assist in mold release, and other materials, such as pigments or colorants, may also be included in these mixtures. If the unsaturated polyester-polyurethane network is to contain domains bonded to other polymer resins, such as epoxy resins, acrylic resins, vinyl ester resins, siloxane resins, or combinations thereof, these resins or precursors thereof may be added, desirably in liquid form, to the basic hybrid system prior to formation of the complex crosslinked network, and may optionally be included with the hybrid forming components and thus help to wet out the dry components.

In products wherein control of thermal expansion is important, an open-weave fabric should be used as the dispersed filler particle, as this significantly decreases the coefficient of thermal expansion.

The following nonlimiting examples indicate how to prepare composite materials according to the present invention, and also provide a methodology for determining the optimal combinations of dispersed filler particles and matrix resins, using only the disclosure in this specification and routine experimentation.

EXAMPLE 1

Four commercially available thermoplastic materials were purchased, and included polyvinyl chloride sheet having a thickness of about 0.125 inch, delrin (LEXAN) sheet having a thickness of about 0.125 inch, acrylic rodstock having a diameter of about 3 inches, and reground scrap CPVC plastic that normally would be landfilled. Two 4×4 inch squares were removed from each of the sheet materials. Two plates of 3 inches diameter and thickness of 0.250 inch were cut from the acrylic rod. The reground scrap CPVC was not machined.

Four to five drops of a uninhibited styrene monomer, identical to that used as a crosslinker and diluent for commercially available polyesters and vinyl esters was placed on one surface of one of the polyvinyl chloride sheets, and the remaining sheet was placed into contact therewith. This procedure was followed for the delrin sheets and the acrylic plates.

A mixture of 30 grams of the reground scrap CPVC and 5 drops of styrene were placed in the bottom of a small mold.

Slight pressure was applied to the specimens of all four materials for three minutes. At the end of this time, the pressure was released. All four materials were solvent bonded together.

This example illustrates the use of reactive monomer to wet out the dispersed filler particles used in the present invention, and to solvent bond the materials used in these dispersed filler particles, providing adhesion between the dispersed filler particles and the continuous phase matrix through the reactive monomer.

EXAMPLE 2

A combination of fly ash, CPVC reground plastic, and binder were mixed according to the Table below.

| SIDE A | SIDE B |
| --- | --- |
| 140 g unsaturated polyester polyol resin diluted with styrene (HC-100, Polymer Development Lab.) | 54 g polyisocyanate (5205, Carpenter) |
| 15 g saturated polyol (5126, Carpenter) | 5 g benzoyl peroxide in tricresyl phosphate (BPO, Carpenter) |
| 3 g silicone surfactant (DC 193, Air Products) | |
| 215 g Type F fly ash | |
| 475 g chlorinated polyvinyl chloride chips | |
| 4 g coloring pigment | |

Side A was allowed to stand for three minutes, and was stable. After three minutes, Side B was mixed with Side A. Because polymerization is initiated at this point, the mixture must be poured into a mold within two minutes.

After curing, an inexpensive solid material was obtained containing over 80 percent by weight of filler and reinforcing particles which demonstrated high compression strength and other desirable properties (such as tensile strength, tensile modulus, flexural strength, flexural modulus, and compression modulus) at low cost. Testing and examination of the material indicated that many of the dispersed CPVC particles fractured when the structure containing them was broken, indicating excellent chemical bonding. Direct solvent bonding between dispersed particles was also observed. The dispersed CPVC particles perform at least three functions in the resulting composite: (a) providing the overall composite with increased ductility; (b) providing a low cost method of obtaining desired physical properties; and (c) providing the composite with excellent flame retardancy. In addition, their use in the composite eliminates material that would have to be landfilled.

EXAMPLE 3

9 lbs of a mixture of hybrid resin containing 30 percent by weight of fly ash and 1 percent by weight of Kevlar pulp was prepared according to the table below.

| SIDE A | SIDE B |
| --- | --- |
| 80.3 g unsaturated polyester polyol resin diluted with styrene (5180, Carpenter) | 27.1 g. polyisocyanate (5205, Carpenter) |
| 18.1 g saturated polyester polyol (5126, Carpenter) | 4.0 g benzoyl peroxide in tricresyl phosphate (BPO, Carpenter) |
| 1.6 g silicone surfactant (DC 193, Air Products) | |
| 57 g Type F fly ash | |
| 1.9 g aramid based fiber, 1.5 mm thick (Kevlar, DuPont) | |

The Side A components were mixed and allowed to thoroughly saturate or wet out the Kevlar fibers. The mixture of Side A components and Kevlar fibers became significantly thickened. The Side B components were mixed in a separate vessel. The Side B mixture was added to the Side A mixture and mixed thoroughly for 120 seconds.

The mixture was poured into a mold cavity 80 inches long, 19 inches wide, and ⅛ inch thick. The mold was mounted in a Dake press capable of exerting a pressure of 250 psi over the entire planar area of the mold. The mold temperature was maintained at 205° F. and the material remained in the mold for 10 minutes. At the end of this time, the press was opened and the material demolded in the form of a panel and allowed to cool.

At a later date, the difference in the length of the panel at −10° F., and at 70° F. was measured.

Upon heating to 70° F., the panel had increased in length by 0.230 inches.

EXAMPLE 4

9 lbs of a mixture similar to that of Example 3, but modified by the addition of commercially available vinyl ester (novolac epoxy based) containing 30 percent by weight fly ash and 1 percent by weight of Kevlar pulp was prepared according to the table below. This composition is the same as in Example 3, except that the saturated polyester polyol (5126) was replaced by a novolac epoxy based vinyl ester. Again, the mixture of Side A components and Kevlar pulp became significantly thickened.

| SIDE A | SIDE B |
| --- | --- |
| 80.3 g unsaturated polyester polyol resin diluted with styrene (5180, Carpenter) | 21.8 g. polyisocyanate (5205, Carpenter) |
| 18.1 g novolac epoxy vinyl ester (411–45, Dow) | 4.0 g benzoyl peroxide in tricresyl phosphate (BPO, Carpenter) |
| 1.6 g silicone surfactant (DC 193, Air Products) | |
| 57 g Type F fly ash | |
| 1.9 g aramid based fiber, 1.5 mm thick (Kevlar, DuPont) | |

The procedures set forth above in Example 3 were followed. The measured change in length between −10° F. and 70° F. was 0.210 inch, slightly less than that observed in Example 3.

This example indicates that the bonding between the Kevlar fiber and the epoxy-containing resin is approximately equivalent to that between the Kevlar fiber and the saturated polyester-containing resin.

EXAMPLE 5

9 lbs of a mixture of hybrid resin containing 30 percent by weight of fly ash, 5 weight percent carbon fibers, and 2.5 weight percent ceramic fibers was made according to the table below.

| SIDE A | SIDE B |
| --- | --- |
| 80.3 g unsaturated polyester polyol resin diluted with styrene (5180, carpenter) | 27.1 g polyisocyanate (5205, Carpenter) |
| 18.1 g saturated polyester | 4.0 g benzoyl peroxide in |

| SIDE A | SIDE B |
| --- | --- |
| polyol (5126, Carpenter) | tricresyl phosphate (BPO, Carpenter) |
| 1.6 g silicone surfactant (DC 193, Air Products) | |
| 52.1 g Type F fly ash | |
| 10.1 g carbon fiber, 180 m × 11 m, (VMX-Varx-24 thornel, Amoco) | |
| 5 g fused silica alumina ceramic fiber (bulk-KMTX, Carborundum) | |

The Side A components were mixed and allowed to thoroughly saturate or wet out the fiber additions. The Side B components were added to the Side A components and mixed thoroughly for 120 seconds. The material was molded by following the procedure set forth in Examples 3 and 4, above, except that the mold temperature was 210° F.

The change in length upon heating from −10° F. to 70° F. was 0.141 inches, which is a significant improvement over the changes observed in Examples 3 and 4. This 39% reduction in expansion is not the result of the change in filler alone, and indicates that there is either improved bonding between the matrix and the fibers, or a fiber interaction, or both, that results in this improved reduction in expansion.

EXAMPLE 6

9 lbs. of a mixture of hybrid modified by substituting the commercially available vinyl ester novolac epoxy resin of Example 4 for the saturated polyol and containing 30 percent by weight of fly ash, 5 weight percent carbon fibers, and 2.5 weight percent ceramic fibers was made according to the table below.

| SIDE A | SIDE B |
| --- | --- |
| 80.5 g unsaturated polyester polyol resin diluted with styrene (5180, Carpenter) | 21.8 g polyisocyanate (5205, Carpenter) |
| 18.1 g novolac epoxy vinyl ester (411–45, Dow) | 4.0 g benzoyl peroxide in tricresyl phosphate (BPO, Carpenter) |
| 1.6 g silicone surfactant (DC 193, Air Products) | |
| 62.1 g Type F fly ash | |
| 10.1 g carbon fiber, 180 m × 11 m, (VMX-Varx-24 thornel, Amoco) | |
| 5 g fused silica alumina ceramic fiber (bulk-KMTX, Carborundum) | |

The procedure followed was the same as that used in Example 5, except that the mold temperature was 205° F.

The change in length from −10° F. to 70° F. was 0.094 inch, a reduction equivalent to many fiberglass BMC materials. This represents a 55% reduction in expansion compared to Example 4. This 55% reduction is not explainable by the change in filler level or by fiber interactions, since a 0.094 inch change in length was not exhibited by Example 5. The expansion reduction is due to the excellent bonding between the novolac epoxy vinyl ester resin with one or both of the fiber additives.

As the above Examples 2–6 show, the addition of specific polymer forming materials to the composition results in products wherein those polymers not only affect the physical and chemical properties of the matrix, but react with the dispersed filler particles (and in some instances with the fine multisize reinforcing particles as well). For example, Kevlar fibers exhibited no significant difference in properties when used in a matrix containing an epoxy resin, as compared to a matrix containing a saturated polyester resin (compare Example 3 and Example 4). However, by selecting a ceramic fiber and a carbon fiber as the dispersed filler materials and an epoxy containing resin as the matrix material, significant decreases in thermal expansion are obtained (compare Example 6 to Examples 3, 4, and 5). The examples show that the fine multisize reinforcing particle filled unsaturated polyester-polyurethane containing resin of the presently claimed invention provides an adaptable starting point for the inclusion of dispersed filler particles which can be made to preferentially react with the unsaturated polyester-polyurethane resin itself, or with optional additional polymer components, either through direct chemical bonding or crosslinking therewith. This allows for excellent properties and for excellent control thereover.

EXAMPLE 7

In vessel 1, a multipolymer system containing a unsaturated polyester hybrid polyol resin was blended with a novolac epoxy based vinyl ester. Additionally, Type F fly ash was added in sufficient amount that the weight percent of this component would equal 50 weight percent of the final mixture. Independently, in vessel 2 a methylene diphenyl isocyanate was blended with 50% benzoyl peroxide paste. The relative amounts of each component is given below.

| Vessel 1 | Vessel 2 |
| --- | --- |
| 148 g unsaturated polyester polyol (Carpenters 5180) | 44 g methylene diphenyl isocyanate |
| 22 g novolac epoxy based vinyl ester (Dow Duracane 411–45) | 6 g 50% benzoyl peroxide paste |
| 220 g Type F fly ash | |

The materials in each vessel are mixed independently, and then the contents of each vessel are combined and placed in a mold, wherein polymerization is initiated. Within ten minutes, the liquid in the mixture has polymerized to a solid, evenly crosslinked thermoset polymer, which contains urethane components, unsaturated polyester components, and epoxy components. Not only is its heat resistance significantly increased when compared to compositions made from the hybrid resin alone, but additional reinforcement potentials are possible due to the integral epoxy component, which is fully crosslinked into the polymer. The coefficients of thermal expansion of the resulting material is significantly reduced as compared to that of either the epoxy resin or the hybrid resin, individually.

EXAMPLE 8

The same procedure was followed as in Example 7, except that an open-weave ceramic fiber mat (250 square mesh, basalt) is placed in the mold. The highly filled mixed liquid obtained by mixing the contents of vessel 1 and vessel 2 is poured over the ceramic fiber mat and allowed to polymerize. Upon curing, it is found that excellent bonding has occurred between this polymer mixture and the fiber components. The excellent chemical compatibility between the components of the hybrid mix and the novolac epoxy based composition allows the formation of a material containing epoxy that bonds better to many ceramic materials than the hybrid resin alone. This is due to both the compatibility of certain sizing compounds to ceramic compositions and to the inherent high bond strengths of epoxy compounds to refractory compositions.

EXAMPLE 9

The procedure followed in Example 8 was repeated, except that the mold contained an alumina silica refractory blend (Carborundum, bulk-EF122S) made into a very loose mat. Excellent bonding between the highly filled polymer material and the ceramic material was also observed.

EXAMPLE 10

In vessel 1, a multipolymer system containing a unsaturated polyester hybrid polyol resin was blended with a novolac epoxy based vinyl ester. Additionally, Type F fly ash and sized slate chips were added in sufficient amount that the weight percent of these components would equal 85 weight percent of the final mixture. Independently, in vessel 2 a methylene diphenyl isocyanate was blended with 50% benzoyl peroxide paste. The relative amounts of each component is given below.

| Vessel 1 | Vessel 2 |
| --- | --- |
| 148 g unsaturated polyester polyol (Carpenters 5180) | 44.1 g methylene diphenyl isocyanate |
| 22 g novolac epoxy based vinyl ester (Dow Duracane 411–45) | 6 g 50% benzoyl peroxide paste |
| 240 g Type F fly ash | |
| 1050 g needle-like slate chips, which were sized to pass through 0.0937 inch mesh and not pass through 0.078 inch mesh (obtained from LeSeur-Richmond Slate Corp.) | |

The materials in each vessel are mixed independently, and then the contents of each vessel are combined (vessel 2 is added to vessel 1) and mixed for 90 seconds. The mixed contents were poured into a 10 inch×16 inch×0.187 inch lined mold and vibrated flat. A solid, fully cured mass bearing a very close resemblance to actual slate was produced. Not only did the overall solid possess excellent resistance to heat, but the needle-like slate particles were well bonded to the matrix, and provided additional tensile and impact strength to the filled structure. The overall density of the material was 120 lb/ft³, approaching that of actual slate.

A two part experiment was conducted to show the wide range of chemical changes possible with the polyurethane/unsaturated polyester hybrid structure and the effect that these changes have on chemical bonding in the resulting product. Example 11 involves the addition of a thermoset novolac vinyl ester polymer that should bond chemically with reinforced and nonreinforced pellets of thermoplastic ABS (acrylonitrile-butadiene-styrene). In Example 12, the epoxy component was eliminated, and a polyol was added that reacts with isocyanate to form a ductile urethane. In this example, the hybrid contained a higher urethane percentage than in Example 11, and as a result, interfacial bond strengths were expectedly lower. Because the reinforced and nonreinforced ABS pellets were different in color, qualitative observations could also be made.

EXAMPLE 11

In vessel 1, a multipolymer system containing a unsaturated polyester polyol was blended with a novolac epoxy based vinyl ester. Additionally, Type F fly ash and mixed pellets of reinforced and nonreinforced ABS were added. The total percentage of fly ash and ABS particles approximated 70 percent by weight of the final mixture. Independently, in vessel 2 a methylene diphenyl isocyanate was blended with 50% benzoyl peroxide paste. The relative amounts of each component is given below.

| Vessel 1 | Vessel 2 |
| --- | --- |
| 100 g unsaturated polyester polyol (Carpenters 5180) | 28 g methylene diphenyl isocyanate |
| 40 g novolac epoxy based vinyl ester (Dow Duracane 411–45) | 6 g 50% benzoyl peroxide paste |
| 176 g Type F fly ash | |
| 176 g mixed glass reinforced and nonreinforced ABS pellets (cylindrical, 0.13 in diameter, 0.19 in length, obtainable from various manufacturers) | |

The materials in each vessel are mixed independently, and then the contents of each vessel are combined and mixed, whereupon polymerization was initiated. The mixed material was immediately poured into tensile bar molds and a flat plate mold. The mixture hardened within 10 minutes, and was post cured for 1 hour at 250° F. Cured samples were tested to failure, and the fracture surfaces observed. About 70–80 percent of the samples containing nonreinforced ABS pellets sheared throughout, and about 50 percent of the materials containing the glass reinforced ABS sheared, while the remaining 50% showed particles which pulled out of the matrix. Overall, the chemical bonding was excellent.

EXAMPLE 12

In vessel 1 a two polymer system containing a high percentage of a urethane former was blended with fly ash and mixed glass reinforced and nonreinforced ABS pellets. The epoxy component used in Example 11 was not added. However, the total percentage of filler and reinforcing particles was maintained at 70 percent by weight. Independently, in vessel 2 a methylene diphenyl isocyanate was blended with 50% benzoyl peroxide paste. The relative amounts of each component is given below.

| Vessel 1 | Vessel 2 |
| --- | --- |
| 100 g unsaturated polyester polyol (Carpenters 5180) | 39 g methylene diphenyl isocyanate |
| 40 g saturated polyester polyol (Carpenters 5126) | 4 g 50% benzoyl peroxide paste |
| 185 g Type F fly ash | |
| 185 g mixed glass reinforced and nonreinforced ABS pellets (cylindrical, 0.13 in diameter, 0.19 in length, obtainable from various manufacturers) | |

The materials in each vessel are mixed independently, and then the contents of each vessel are combined and mixed, whereupon polymerization was initiated. The mixed material was immediately poured into tensile bar molds and a flat plate mold. The mixture hardened within 10 minutes, and was post cured for 1 hour at 250° F. Cured samples were tested to failure, and the fracture surfaces observed. In contrast to Example 11, about 40–50% of the nonreinforced pellets sheared through. 100% of the reinforced pellets pulled out of the matrix, indicating lower interfacial bond strengths than in Example 11. However, a much more ductile polyurethane/unsaturated polyester hybrid is obtained.

Foamed materials within the scope of the present invention can be prepared by using fine multisize reinforcing particles having an entrained blowing agent, and/or capable of releasing the blowing agent to the matrix system as it is forming, in accordance with the teachings of U.S. Ser. No. 08/348,973 and U.S. Pat. Nos. 5,369,147 and 5,302,634, which are hereby incorporated by reference.

The products of the present invention may be used, e.g., as building materials, e.g., as solid roofing materials (e.g., slates or tiles, which are lightweight in the foamed form), as decorative or architectural products, as outdoor products, as low cost insulation panels, as fencing, as buoyant or corrosion-resistant marine products, etc., by forming the resin in a mold of suitable size and shape, according to art recognized methods and then using the molded product in an art-recognized way.

For example, non-filler specific uses include sheet materials for use in composite structures (both solid and foamed); nonstructural products (e.g., interior and exterior moldings, picture frames, decorative and architectural products, and mantles); and cast structures that do not have critical requirements for their physical or chemical properties (e.g., sink tops, interior corrosion resistant tiles, etc.).

Materials containing specific fillers or specific polymer networks in the matrix may be used in applications requiring the properties provided by those fillers and the particular matrix phase. For example, open weave fabrics, or ceramic and carbon fibers as dispersed filler materials combined with an unsaturated polyester-polyurethane-epoxy resin system can be used in applications requiring control of thermal expansion.

Plastic scrap having particular properties, such as the fire resistance possessed by CPVC can be used as the dispersed filler particles in matrix systems containing a reactive monomer, such as styrene or known adhesive components which are present along with the hybrid forming components, and that bond well with the particle material.

Matrix materials containing an unsaturated polyester-polyurethane-siloxane in the matrix material provide excellent UV stability and a flexible bonding agent. In addition, these siloxane-containing matrices bond well with both fly ash (as the fine multisize reinforcing particles) and ceramic or glassy dispersed filler particles, as well as with metals, paper, and many thermosetting material-containing elastomers (e.g., cured SRIM scrap containing glass fiber). These products can be used as exterior molding, tiles, pool tiles, window trim, and decorative shutters. Structural uses are also possible.

The present invention allows for the conversion of a number of different types of waste material, both in the form of time multisize reinforcing particles and as dispersed filler particles, into a value-added, useful material having superior properties, while at the same time avoiding the social and economic costs associated with disposal of this material.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rigid or semirigid filled resin material, comprising:
   (A) a continuous phase comprising a matrix comprising a complex crosslinked network comprising an unsaturated polyester-polyurethane containing resin, wherein said unsaturated polyester-polyurethane containing resin is the reaction product of reaction components comprising an unsaturated polyester polyol, a saturated polyol, a poly- or diisocyanate, and a reactive monomer, and wherein said matrix optionally further comprises:
      (1) polyurethane modified hybrid networks;
      (2) networks of polymerization products of reactive monomers;
      (3) networks of polymerization products of saturated polyester polyol and poly- or diisocyanates;
      (4) other networks that may form before, during, or after the formation of the polyester-polyurethane containing resin; or
      (5) mixtures of the above networks; and
   (B) a dispersed phase comprising:
      (1) fine multisize reinforcing particles dispersed in said matrix of said continuous phase; and
      (2) dispersed filler particles different from said fine multisize reinforcing particles, and having a surface region bonded to said matrix.

2. The rigid or semirigid filled resin material according to claim 1, wherein said unsaturated polyester-polyurethane containing resin has been at least partially crosslinked with a reactive monomer.

3. The rigid or semirigid filled resin material according to claim 1, wherein said unsaturated polyester-polyurethane containing resin has been at least partially crosslinked with poly- or diisocyanate.

4. The rigid or semirigid filled resin material according to claim 1, wherein said matrix comprises an interpenetrating polymer network.

5. The rigid or semirigid filled resin material according to claim 1, wherein said matrix further comprises a polyurethane network obtained by the reaction of a diisocyanate or polyisocyanate with a saturated polyester or polyether polyol.

6. The rigid or semirigid filled resin material according to claim 1, wherein said matrix further comprises a modified polyurethane hybrid resin obtained by the reaction of a polyisocyanate, an unsaturated polyester polyol, a saturated polyester or polyether polyol, and styrene monomer in the presence of a free radical initiator.

7. The rigid or semirigid filled resin material according to claim 1, wherein said continuous phase further comprises a flame retardant.

8. The rigid or semirigid filled resin material according to claim 5, wherein said flame retardant comprises a halogenated diol or polyol.

9. The rigid or semirigid filled resin material according to claim 1, wherein said multisize reinforcing particles have a particle size in the range of submicron to 200 microns.

10. The rigid or semirigid filled resin material according to claim 1, wherein said multisize reinforcing particles are selected from the group consisting of slate dust, treated red mud, aluminum hydrates, alkaline earth metal carbonates, calcium sulfate, metal borates, feldspars, clays, kaolinite, bentonite, beidellite, hydroxides, fly ash, diatomaceous earth, broken or cracked microballoons, broken or cracked microspheres, cenospheres separated from fly ash, Fullers earth, wood flour, cork dust, cotton flock, wool felt, shredded or finely powdered cornstalks, finely ground nut shells, and mixtures thereof.

11. The rigid or semirigid filled resin material according to claim 1, wherein said multisize reinforcing particles are selected from the group consisting of slate dust, treated red mud, aluminum hydrates, metal borates, feldspars, clays, kaolinite, bentonite, beidellite, hydroxides, fly ash, diatomaceous earth, broken or cracked microballoons, broken or cracked microspheres, cenospheres separated from fly ash, Fullers earth, cork dust, cotton flock, wool felt, shredded or finely powdered cornstalks, finely ground nut shells, and mixtures thereof.

12. The rigid or semirigid filled resin material according to claim 1, wherein said multisize reinforcing particles are selected from the group consisting of treated red mud, aluminum hydrates, metal borates, feldspars, clays, kaolinite, bentonite, beidellite, hydroxides, and mixtures thereof.

13. The rigid or semirigid filled resin material according to claim 1, wherein said reinforcing particles are selected from the group consisting of diatomaceous earth, broken or cracked microballoons, broken or cracked microspheres, cenospheres separated from fly ash, Fullers earth, cork dust, cotton flock, wool felt, shredded or finely powdered cornstalks, finely ground nut shells, and mixtures thereof.

14. The rigid or semirigid filled resin material according to claim 1, wherein said dispersed filler particles are selected from the group consisting of thermoplastic particulate material, thermoset particulate material, elastomeric particulate material, inorganic particulate material, and mixtures thereof.

15. The rigid or semirigid filled resin material according to claim 14, wherein said dispersed filler particles are said thermoplastic particulate material, and are ground chlorinated polyvinyl chloride.

16. The rigid or semirigid filled resin material according to claim 14, wherein said dispersed filler particles are said particulate thermoset material, and are ground reinforced polyurethane or ground polyester filled thermoset scrap.

17. The rigid or semirigid filled resin material according to claim 14, wherein said dispersed filler particles are said elastomeric particulate material, and are ground rubber.

18. The rigid or semirigid filled resin material according to claim 14, wherein said dispersed filler particles are said inorganic particulate material, and are slate particles or chips, glass, or sand.

19. The rigid or semirigid filled resin material according to claim 1, wherein said dispersed filler particles are selected from the group consisting of mineral fillers, ceramic flock, chopped glass, chopped polymer fiber, directional or non-directional glass fabrics, steel, finely ground powdered rubber, and mixtures thereof.

20. The rigid or semirigid filled resin material according to claim 19, wherein said mineral filler is selected from the group consisting of silicate, asbestos, calcium carbonate, calcium sulfate, mica, barytes, alumina, talc, carbon black, metal oxides, quartz, novaculite silica, garnet, saponite, calcium oxide, and mixtures thereof.

21. The rigid or semirigid filled resin material according to claim 14, wherein said dispersed filler particles further comprise surface modifications sufficient to enhance bonding between the dispersed filler particles and the continuous phase matrix.

22. The rigid or semirigid filled resin material according to claim 1, wherein said dispersed filler particles have a particle size equal to or larger than that of said fine multisize reinforcing particles, and a maximum particle size less than about 0.25 inches.

23. The rigid or semirigid filled resin material according to claim 1, wherein said dispersed filler particles are present in an amount of from 15 to 75 % by weight of the total resin material.

24. The rigid or semirigid filled resin material according to claim 1, wherein said reaction components further comprise a polymer resin-forming compound capable of reacting with at least one of the other reaction components, with the reaction product of the other reaction components, or of polymerizing, to form a polymer containing network.

25. The rigid or semirigid filled resin material according to claim 24, wherein said unsaturated polyester-polyurethane containing resin comprises an unsaturated polyester-polyurethane-polymer containing resin, wherein said resin is the reaction product of said other reaction components and said polymer resin-forming compound.

26. The rigid or semirigid filled resin material according to claim 24, wherein said complex crosslinked network further comprises (4) said other network that may form before, during, or after the formation of the polyester-polyurethane containing resin, and wherein said other network comprises a network formed by the reaction or polymerization of said polymer resin-forming compound.

27. The rigid or semirigid filled resin material according to claim 25, wherein said unsaturated polyester-polyurethane-polymer containing resin comprises an unsaturated polyester-polyurethane-epoxy resin which is the reaction product of an unsaturated polyester polyol, a saturated polyester or polyether polyol, a reactive epoxy compound, a poly- or diisocyanate, and a reactive monomer.

28. The rigid or semirigid filled resin material according to claim 25, wherein said unsaturated polyester-polyurethane-polymer containing resin comprises an unsaturated polyester-polyurethane-vinyl ester resin which is the reaction product of an unsaturated polyester polyol, a saturated polyester or polyether polyol, a reactive vinyl ester compound, a poly- or diisocyanate, and a reactive monomer.

29. The rigid or semirigid filled resin material according to claim 25, wherein said unsaturated polyester-polyurethane-polymer containing resin comprises an unsaturated polyester-polyurethane-acrylic resin which is the reaction product of an unsaturated polyester polyol, a saturated polyester or polyether polyol, a reactive acrylic compound, a poly- or diisocyanate, and a reactive monomer.

30. The rigid or semirigid filled resin material according to claim 25, wherein said unsaturated polyester-polyurethane-polymer containing resin comprises an unsaturated polyester-polyurethane-siloxane resin which is the reaction product of an unsaturated polyester polyol, a saturated polyester polyether polyol, a reactive siloxane compound, a poly- or diisocyanate, and a reactive monomer.

31. A rigid or semirigid, lightweight filled resin material according to claim 1, wherein said continuous phase comprises cellular voids therein, and wherein the diameter of the largest of said multisize particles is no greater than about 33% of the average thickness of walls between said cellular voids, and wherein at least a portion of said multisize particles are capable of containing and releasing a blowing agent during the formation of said polyester polyurethane resin.

32. The rigid or semirigid filled resin material according to claim 1, which is nonfoamed, and wherein said continuous phase is substantially free of cellular voids.

33. A process for producing the rigid or semirigid filled resin material of claim 1, comprising:

(A) obtaining reaction components comprising an unsaturated polyester polyol, a diisocyanate or polyisocyanate, a saturated polyol, a reactive monomer, and a free radical initiator;

(B) dry mixing fine multisize reinforcing particles with dispersed filler particles different from said fine multisize reinforcing particles and having a surface region capable of bonding with one or more of said reaction components or with a network formed by said reaction components, or with a matrix formed by said network;

(C) introducing at least one liquid reaction component to the dry mixture obtained in (B) in an amount sufficient to wet out the dry mixture;

(D) mixing the remaining reaction components obtained in (A) with the wetted out dry mixture obtained in (C);

(E) reacting the reaction mixture obtained in (D).

34. The process for producing the rigid or semirigid filled resin material of claim 33, wherein said reacting step (E) is carried out in an extrusion die.

35. The process for producing the rigid or semirigid filled resin material of claim 34, wherein said extrusion die comprises a screw extruder.

36. The process according to claim 33, wherein said saturated polyol is a saturated polyester polyol.

37. The process according to claim 33, wherein said reaction components further comprise an organic diol or polyol.

38. The process according to claim 33, wherein said multisize reinforcing particles are selected from the group consisting of treated red mud, aluminum hydrates, alkaline earth metal carbonates, calcium sulfate, metal borates, feldspars, clays, kaolinite, bentonite, beidellite, hydroxides, fly ash, diatomaceous earth, broken or cracked microballoons, broken or cracked microspheres, cenospheres separated from fly ash, Fullers earth, wood flour, cork dust, cotton flock, wool felt, shredded or finely powdered cornstalks, finely ground nut shells, and mixtures thereof.

39. The process according to claim 33, wherein said multisize reinforcing particles are selected from the group consisting of treated red mud, aluminum hydrates, alkaline earth metal carbonates, calcium sulfate, metal borates, feldspars, clays, kaolinite, bentonite, beidellite, hydroxides, fly ash, diatomaceous earth, broken or cracked microballoons, broken or cracked microspheres, cenospheres separated from fly ash, Fullers earth, cork dust, cotton flock, wool felt, shredded or finely powdered cornstalks, finely ground nut shells, and mixtures thereof.

40. The process according to claim 33, wherein said multisize reinforcing particles are selected from the group consisting of fly ash, diatomaceous earth, broken or cracked microballoons, broken or cracked microspheres, cenospheres separated from fly ash, Fullers earth, cork dust, cotton flock, wool felt, shredded or finely powdered cornstalks, finely ground nut shells, and mixtures thereof.

41. The process according to claim 33, wherein said reaction components further comprise a flame retardant.

42. The process according to claim 33, wherein said flame retardant comprises a halogenated diol or polyol.

43. The process according to claim 33, wherein said reaction components further comprise a catalyst and surfactant.

44. The process according to claim 33, wherein said dispersed filler particles are selected from the group consisting of thermoplastic particulate material, thermoset particulate material, elastomeric particulate material, inorganic particulate material, and mixtures thereof.

45. The process according to claim 44, wherein said dispersed filler particles are said thermoplastic particulate material, and are ground chlorinated polyvinyl chloride.

46. The process according to claim 44, wherein said dispersed filler particles are said thermoset particulate material, and are ground reinforced polyurethane or ground polyester filled thermoset scrap.

47. The process according to claim 44, wherein said dispersed filler particles are said elastomeric particulate material, and are ground rubber.

48. The process according to claim 44, wherein said dispersed filler particles are said inorganic particulate material, and are glass or sand.

49. The process according to claim 33, wherein said dispersed filler particles are selected from the group consisting of mineral fillers, ceramic flock, chopped glass, chopped polymer fiber, directional or nondirectional glass fabrics, steel, finely ground powdered rubber, or mixtures thereof.

50. The process according to claim 49, wherein said mineral filler is selected from the group consisting of silicate, asbestos, calcium carbonate, calcium sulfate, mica, barytes, alumina, talc, carbon black, quartz, novaculite silica, garnet, saponite, calcium oxide, and mixtures thereof.

51. The process according to claim 33, wherein said reaction components further comprise a polymer resin-forming compound capable of reacting with at least one of the other reaction components, with the reaction product of the other reaction components, or of polymerizing, to form a polymer containing network.

52. The process according to claim 51, wherein said polymer resin-forming compound comprises a reactive epoxy compound.

53. The process according to claim 51, wherein said polymer resin-forming compound comprises a reactive vinyl ester compound.

54. The process according to claim 51, wherein said polymer resin-forming compound comprises a reactive acrylic compound.

55. The process according to claim 51, wherein said polymer resin-forming compound comprises a reactive siloxane compound.

56. The process according to claim 33, wherein at least a portion of said multisize particles added during step (B) contain a blowing agent, and release said blowing agent during the formation of said polyester polyurethane resin; wherein said reacting step (E) does not include appreciable crosslinking of the reaction mixture, and further comprising:

(F) simultaneously with said reaction, foaming said reaction mixture in the presence of said blowing agent, to form a ductile, lightweight filled resin foam, wherein said blowing agent is released into the reaction system from said fine multisize reinforcing particles; and (G) hardening said ductile lightweight filled resin foam either immediately, or at a future time, by crosslinking to a rigid or semirigid filled foam.

57. The process according to claim 56, wherein said blowing agent is selected from the group consisting of water, trichloromono-fluoromethane, dibromodifluoromethane, dichlorodifluoro-methane, dichlorotetrafluoroethane, monochlorodifluoro-methane, trifluoroethylbromide, dichloromethane, methylene chloride, and mixtures thereof.

58. The process according to claim 57, wherein said blowing agent comprises water.

59. The process according to claim 57, wherein the fine multisize reinforcing particles hold water at different energy levels within the particles, combine water with oxides to form a range of reactive hydroxides, trap water in spongy, foamy cenospheres, contain adsorbed water on diverse carbon particles, or influence water release by organic residues, polycyclic aromatic hydrocarbons, or polynuclear aromatic hydrocarbons.

60. The process according to claim 56, wherein said blowing agent is water and wherein said multisize reinforcing particles are selected from the group consisting of treated red mud, aluminum hydrates, feldspars, clays, kaolinite, bentonite, beidellite, hydroxides, and mixtures thereof.

61. The process according to claim 56, wherein said multisize reinforcing particles are selected from the group consisting of fly ash which has been preloaded with a blowing agent, diatomaceous earth, broken or cracked microballoons, broken or cracked microspheres, cenospheres separated from fly ash, Fullers earth, cork dust, cotton flock, wool felt, shredded or finely powdered cornstalks, finely ground nut shells, and mixtures thereof.

* * * * *

UNITED STATES PATENT AND TRADEMARK OFFICE
CERTIFICATE OF CORRECTION

PATENT NO. : 5,604,266
DATED : February 18, 1997
INVENTOR(S) : John N. Mushovic

It is certified that error appears in the above-indentified patent and that said Letters Patent is hereby corrected as shown below:

Title page, item [54] and Col. 1, line 1,
Page 1, Title, delete "POLYEST" and insert --POLYESTER--

Column 9, line 54, insert "." after above

Column 12, line 23, delete "s-methyl" and insert --α-methyl--

Column 24, line 18, claim 1, delete "in" and insert --and mechanically immobilized in the network of--

Column 24, line 22, claim 1, insert --chemically-- after region

Signed and Sealed this

Fifteenth Day of September, 1998

Attest:

BRUCE LEHMAN

Attesting Officer

Commissioner of Patents and Trademarks